(12) United States Patent
Caldwell

(10) Patent No.: US 7,628,240 B2
(45) Date of Patent: Dec. 8, 2009

(54) FLUID TRANSMISSION WITH IMPROVED TRACTION CONTROL

(75) Inventor: Niall J. Caldwell, Edinburgh (GB)

(73) Assignee: Sauer-Danfoss, Inc., Ames, IA (US)

( * ) Notice: Subject to any disclaimer, the term of this patent is extended or adjusted under 35 U.S.C. 154(b) by 615 days.

(21) Appl. No.: 11/277,054

(22) Filed: Mar. 21, 2006

(65) Prior Publication Data

US 2007/0235233 A1 Oct. 11, 2007

(51) Int. Cl.
*B60K 17/356* (2006.01)
(52) U.S. Cl. .................... 180/242; 180/308
(58) Field of Classification Search ........... 180/242, 180/308
See application file for complete search history.

(56) References Cited

U.S. PATENT DOCUMENTS

| | | | | |
|---|---|---|---|---|
| 5,190,446 A | * | 3/1993 | Salter et al. | 417/297 |
| 5,259,738 A | * | 11/1993 | Salter et al. | 417/505 |
| 6,408,972 B1 | * | 6/2002 | Rodgers et al. | 180/197 |
| 7,300,375 B2 | * | 11/2007 | Petrzik | 475/119 |
| 7,419,025 B2 | * | 9/2008 | Ishii et al. | 180/242 |
| 7,455,130 B2 | * | 11/2008 | Irikura | 180/6.48 |
| 2006/0118346 A1 | * | 6/2006 | Rampen et al. | 180/165 |
| 2008/0251302 A1 | * | 10/2008 | Lynn et al. | 180/65.2 |

* cited by examiner

*Primary Examiner*—Lesley D Morris
*Assistant Examiner*—Michael R Stabley

(57) ABSTRACT

An electronic traction control system for a vehicle having multiple hydraulic driven wheels includes a plurality of digital displacement pumps, a plurality of drive systems having counterbalance valves and motors used to drive wheels, and electronic flow control valves used in association with each drive assembly. Additionally the system has a steering mechanism that is electrically connected to a digital sensor and a proportional sensor that sends signals to a system controller that operates the functioning of the digital displacement hydraulic pumps.

5 Claims, 1 Drawing Sheet

FLUID TRANSMISSION WITH IMPROVED TRACTION CONTROL

BACKGROUND OF THE INVENTION

The present invention relates to the field of vehicles with multiple wheels, each of which are driven individually by a respective hydraulic motor. More particularly, this invention is a low cost electronic traction control system for such vehicles.

Various two-wheel, three-wheel, and four-wheel hydraulic drive arrangements are known for on-road and off-road mobile vehicles or machines. Two problems commonly associated with multiple wheel hydraulic drive arrangements are: 1) wheel slipping (overspeeding), and 2) wheel dragging (underspeeding). Wheel slipping or overspeeding results when the hydraulic motor drives its wheel at too high of a speed relative to the other wheels or the existing traction conditions. The wheel then tends to spin, making it ineffective for traction and steering purposes. Furthermore, the spinning wheel can consume all of the available workflow from the hydraulic pump, thereby starving the other motors and causing the vehicle to stop. Wheel dragging or underspeeding occurs when the wheel is stopped or slowed in an abrupt manner. Abrupt deceleration of the wheel can lead to turf damage, jerkiness, loss of steering control and undesirable tire wear.

One traditional approach that addresses these problems is to provide the circuit with hydraulic combiner/divider (C/D) valves. The C/D valve has a relatively low cost, but its inclusion in the circuit limits performance. The C/D valve works on the basis of a pressure differential across the supply and work ports. When a machine most needs positive traction, the flow from the drive pump is usually quite low. Therefore, the pressure drop across the C/D valve is usually not sufficient to properly engage the working spools of the valve. Without further operator intervention, a slipping wheel would consume all of the available workflow and the machine would stop. The operator normally must command more flow from the pump, which equates to greater traveling speed, in order to reach a threshold of flow that generates the necessary pressure drop to allow the C/D valve to perform its intended function of forcefully dividing flow to the various working motors. When working near a construction site, around people, ordinary equipment, an operator command to increase the work flow from the drive pump in order to engage the traction control function is not only undesired, but may also be unsafe. Conventional C/D valves also introduce considerable heat into a hydraulic circuit by virtue of the differential pressure drop. The pressure drop is proportional to the system flow and is therefore greatest when the machine is in a high speed traveling mode rather than during turning or low-speed off-road operation. Traction control is typically not required when the machine is traveling at higher speeds. Thus, heat is constantly being added to the system by the C/D valve, independently of the actual vehicle need for traction control. Heat is a natural enemy of a hydraulic transmission. Thus, there is a need for a non-complex, low cost electronic traction control system that offers improved performance.

Another approach that addresses these problems is taking a variable displacement pump and connecting it in closed circuit to a plurality of two-port, two-position, bi-directional, normally open, proportional flow control valves that control flow to a plurality of motors that rotate drive wheels. Though this improves upon previous methods, problems with this method still remain. Specifically, in order to accurately control the variable displacement pump, motor speed sensors need to be connected to the output shaft that connects each motor to each driving wheel in order to determine the rotational speed of the shaft. Then the sensors send an electronic signal to an electronic controller that controls the variable displacement pump. Implementing a plurality of speed sensors on each output shaft of each drive wheel is expensive. Furthermore, the transmission must have a closed circuit that causes pressure drops and inefficiencies known to closed circuits.

Therefore, a primary objective of the present invention is the provision of an improved electronic traction control system for a four wheel drive vehicle. Another objective of this invention is the provision of an electronic control system that is durable, economical to produce, and reliable to use.

These and other objectives will be apparent from the drawings, as well as from the description and claims that follow.

SUMMARY OF THE INVENTION

An electronic traction control system for a vehicle having multiple hydraulically driven wheels. The system includes a steering mechanism, a system controller, a plurality of digital displacement hydraulic pumps, a plurality of drive assemblies having counterbalance valves and motors that actuate wheels, and an electric flow control valve for each drive assembly and the steering mechanism. The system controller receives electronic signals from the steering mechanism influencing the digital displacement hydraulic pumps to provide fluid through the electronic flow control valves to each drive assembly to rotate the wheels of the vehicle based on the electronic signals.

BRIEF DESCRIPTION OF THE DRAWINGS

The FIGURE shows a hydraulic schematic diagram depicting the anti-slip assembly and its placement in a hydrostatic transmission circuit for a four wheel drive vehicle.

DETAILED DESCRIPTION OF THE PREFERRED EMBODIMENT

Figure 1:
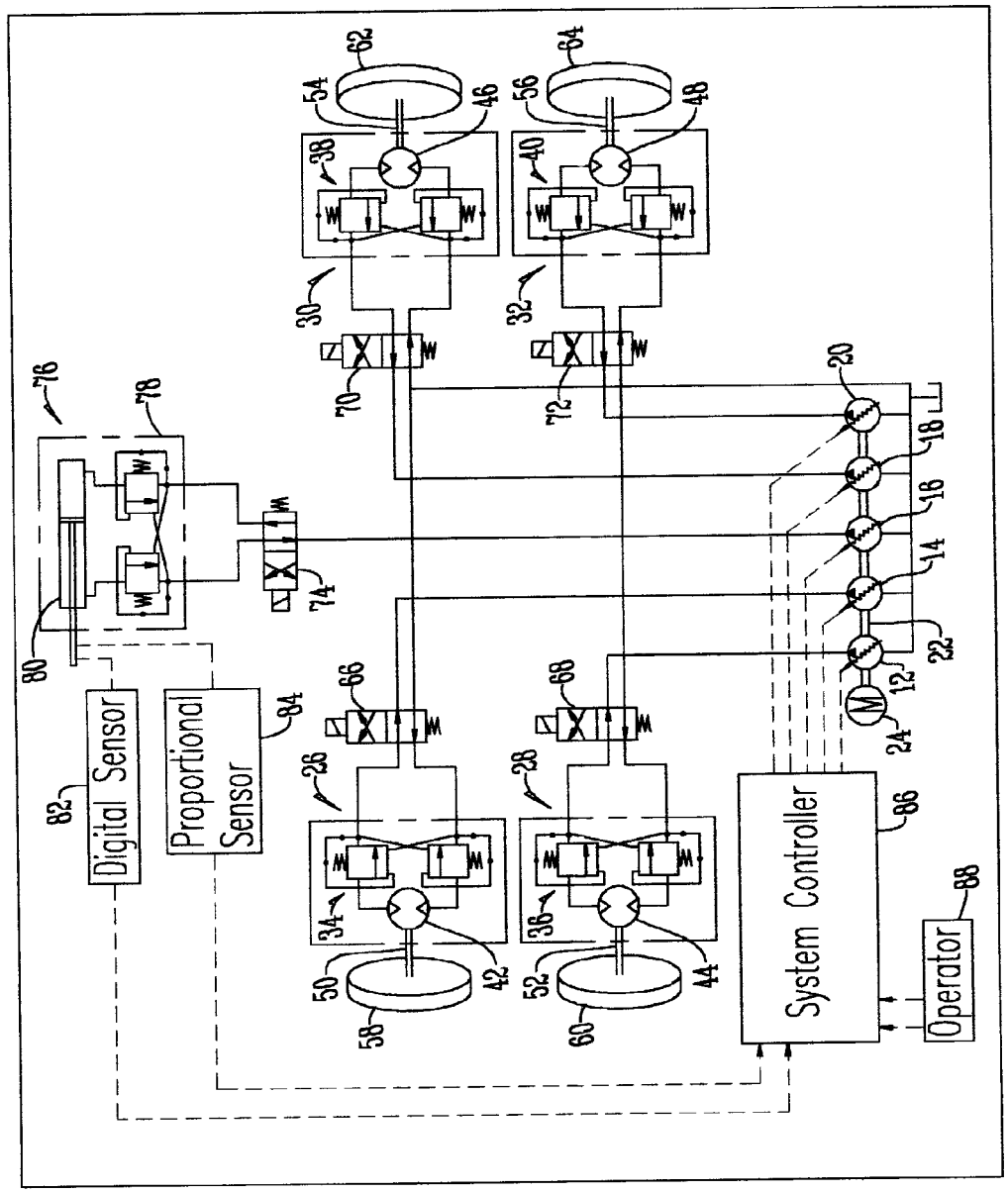

FIG. 1 shows a hydrostatic transmission circuit 10 as an open circuit that includes a plurality of digital displacement pumps 12, 14, 16, 18, 20 that provide discrete units of fluid displacement. A digital displacement pump is a positive displacement fluid working machine whereby the fluid commutation is achieved by sending pulses to electronically-controlled digital fluid valves, rather than means of a mechanical commutator, such that discrete units of volume of the working fluid, corresponding to a single full or partial working stroke, are capable of being of generated or absorbed by the correct sequence of pulses being sent to the digital valves.

The digital displacement pumps 12, 14, 16, 18, 20 are driven by an input shaft 22 that is actuated by a prime mover 24. A plurality of hydraulic drive assemblies 26, 28, 30, and 32 having respective load control valves such as counterbalance valves 34, 36, 38, and 40 are connected to respective motors 42, 44, 46, 48 that have output shafts 50, 52, 54, 56 that are drivingly connected to respective drive wheels 58, 60, 62, and 64. The counterbalance valves 34, 36, 38, and 40 function to generate driving and braking torque in both directions of rotation for the wheels 58, 60, 62, and 64. Fluidly connected to each drive assembly 26, 28, 30, 32 are proportional flow control, or changeover valves respectfully 66, 68, 70, 72 that are each connected to the digital displacement pumps 14, 12, 18, 20. Each changeover valve 66, 68, 70, 72 functions to change the direction of each respective motor 42, 44, 46, 48.

The digital displacement pumps 12, 14, 16, 18, and 20 are also fluidly connected to a proportional flow control, or changeover valve 74 that fluidly connects a steering mechanism 76 to digital displacement pump 16. The steering mechanism 76 has counterbalance valves 78 and a ram 80 that is electronically connected to a digital sensor 82 that determines a steering angle and actuation of the steering mechanism. When a digital sensor 82 is present, a digital displacement pump controls the steering ram by direct displacement control and only requires a digital sensor 82 around the neutral position. The steering angle is inferred from a combination of the integral volume which has been displaced and the signal from the digital sensor 82 which recalibrates this estimate every time the steering angle passes through the neutral point.

Optionally, in another embodiment a proportional sensor 84 determines the angle and actuation of the steering mechanism 76 instead of the digital sensor 82. In this embodiment a conventional steering system is present and requires analog feedback of the steering angle.

The digital sensor 82 and proportional sensor 84 are both electronically and operably connected to a system controller 86 such that the sensors 82 and 84 send input to the system controller 86. The system controller 86 also receives input from an operator 88 and is operably connected to the digital displacement hydraulic pumps 12, 14, 16, 18, 20.

The system controller 86 sends a signal such as a sequence of pulses to the commutating valves within the digital displacement pumps 12, 14, 16, 18, 20 such that a sequence of flow pulses is produced, the time average of which corresponds to the correct hydraulic flow to each drive assembly 26, 28, 30, 32 for rotation of the wheels 58, 60, 62, 64 without slippage based upon the sensor and operator inputs. Specifically, the system controller calculates the optimum speed of each wheel depending on the steering angle and vehicle geometry and sends signals to each pump service to command a flow rate proportional to the desired road speed of a vehicle. Preferably, the pressure in each of the fluid supply lines to each of the motors is limited by the system controller switching the pump from a flow demand mode to a pressure demand mode, this pressure demand mode reducing the flow from the pump such that a pressure limit is not exceeded.

As an example, the system controller 86 in an alterative embodiment commands the pumps 12, 14, 18, 20 to produce a pressure across each motor 42, 44, 46, 48 subject to a flow limit for each motor 42, 44, 46, 48. In this embodiment the flow limit is calculated from the average vehicle speed, the steering angle and the steering geometry of the vehicle.

By using the digital displacement pumps 12, 14, 16, 18, 20 several advantages occur. The pumps 12, 14, 18, 20 compensate for pressure and/or shaft speed variations to produce exactly the commanded flow rate. Thus, there is no need for wheel speed sensors as the pumps 12, 14, 16, 18, 20 are capable of accurately delivering a demanded flow or accumulated volumetric displacement. Additionally, the controller 86 compensates for motor leakage characteristics such that resultant motor speed is exactly what is desired. Specifically, the controller compensates leakage in each of the motors by using the known characteristics of the motor leakage as a function of pressure, speed and temperature, by means of increasing the flow demand of each of the pumps, said control being facilitated by the exceptional accuracy of flow control achieved by pumps working according to the digital displacement principle. The engine speed is adjusted electronically such that the highest flow demanded of any of the pump services is equal to or less than the maximum flow capable of being generated by that service.

When the steering mechanism 76 is fluidly connected to a digital displacement pump 16, the steering angle does not have to be sensed for the controller 86 to properly command the digital displacement pumps 12, 14, 16, 18, 20. Instead the steering angle is inferred from the time integral of the flow delivered by the pumps 12, 14, 16, 18, 20, said pump flow being congruent to the flow demanded of the pumps 12, 14, 16, 18, 20. Though, in this embodiment, binary digital sensors are used to re-calibrate the inferred position of the steering mechanism 76 during activation.

Alternatively, the steering mechanism 76 is not fluidly connected to a digital displacement pump 16 and instead only the drive assemblies 26, 28, 30 and 32 are connected to the digital displacement pumps 12, 14, 18, 20. In this embodiment proportional sensor 84 and other operator inputs are used to properly steer and operate a vehicle.

When the hydrostatic transmission circuit 10 is in operation, the system controller 86 compares the signals from the sensors 82 or 84 and the operator 88 to displace the digital displacement pumps 12, 14, 16, 18, 20 according to the desired application. Each pump 12, 14, 16, 18, and 20 sends a variable amount of fluid to each associated proportional control valves 66, 68, 70, 72, 74 depending on the signal sent by the system controller 86. The proportional control valves 66, 68, 70, 72, 74 then operate in conjunction with the drive assemblies 26, 28, 30, 32 and steering mechanism 76 to ensure that the proper fluid flow is received by each motor 42, 44, 46, 48 and within the steering mechanism 76 to rotate the wheels 58, 60, 62, 64 without slippage or inefficiencies.

Because the digital displacement pumps 12, 14, 16, 18, 20 are used, the fluid flow from the digital displacement hydraulic pumps 12, 14, 16, 18, 20 is in discrete units of fluid displacement providing extremely accurate fluid supply to the motors 42, 44, 46, 48. This eliminates the need to use expensive speed sensors on the motor output shafts 50, 52, 54, and 56 to provide proper traction control. This also allows the full tractive effort of a vehicle with locked differentials, without skidding, even when at full steering angle. The digital displacement hydraulic pumps 12, 14, 16, 18 and 20 additionally allow the circuit 10 be an open circuit thus eliminating pressure drops and inefficiencies associated with closed hydrostatic circuits. Thus at the very least each of the stated objectives has been met.

It will be appreciated by those skilled in the art that other various modifications could be made to the device without the parting from the spirit in scope of this invention. All such modifications and changes fall within the scope of the claims and are intended to be covered thereby.

What is claimed:

1. A hydraulic transmission comprising:
   a steering mechanism;
   a system controller fluidly connected to the steering mechanism;
   a plurality of digital displacement hydrostatic pumps operably connected to the system controller;
   a plurality of drive assemblies fluidly connected to the plurality of the digital displacement pumps that receive fluid from the plurality of digital displacement pumps to rotate a plurality of wheels
   wherein each digital displacement pump is fluidly connected to a separate drive assembly;
   a sensor electrically connected to the system controller that sends a sequence of pulses to a commutating valve within one of the plurality of digital displacement hydrostatic pumps such that a sequence of flow pulses is produced, a time average of which corresponds to a correct hydraulic flow to one of the plurality of drive assemblies to rotate a wheel based upon the sensor and operator inputs.

2. The device of claim 1 wherein the digital displacement pump is within an open circuit having a fluid reservoir.

3. The device of claim 1 further comprising bi-directional valve fluidly connected to the digital displacement pump.

4. The device of claim 1 wherein the drive system comprises at least one counterbalance valve fluidly connected to a motor such that the motor generates driving and braking torque to control rotation of the wheel.

5. The device of claim 1 wherein the sensor is a digital sensor.

* * * * *